Aug. 6, 1968  G. D. CROCKETT ET AL  3,395,521

THATCH REMOVER ATTACHMENT FOR ROTARY LAWNMOWERS

Filed June 23, 1965

INVENTORS.
Garold D. Crockett
George A. Dalphond
BY John A. Hamilton
Attorney.

United States Patent Office 3,395,521
Patented Aug. 6, 1968

3,395,521
THATCH REMOVER ATTACHMENT FOR
ROTARY LAWNMOWERS
Garold D. Crockett, 212 Parkway, and George A. Dalphond, 861 Plaza Drive, both of Salina, Kans. 67401
Filed June 23, 1965, Ser. No. 466,176
3 Claims. (Cl. 56—295)

ABSTRACT OF THE DISCLOSURE

A thatch remover attachment for a rotary lawn mower comprising a horizontal carrier bar adapted to be affixed at its midpoint to the vertical power shaft of the mower, in place of the usual blade bar, and a pair of rigid fingers affixed to said carrier bar respectively at opposite sides of the axis of rotation of said carrier bar and depending therefrom substantially to ground level.

---

This invention relates to new and useful improvements in lawn care apparatus, and has particular reference to a device for assisting in the removal of creeper-type grass "thatch" from lawns.

Certain types of Bermuda grass and other types of "creeper" grasses are characterized by long stalks or creepers which tend to lie horizontally and extend along the surface of the ground for considerable distances. These stalks become intertwined and interwoven to form a thick, springy layer often called a "thatch," which is highly attractive and desirable in many circumstances. However, each spring the dry, dead thatch of the previous season's growth should be removed to prevent it from choking out and inhibiting the new season's growth. The thatch is often very tough and strong, and the removal thereof is a difficult and tedious operation. Ordinary power rakes are usually completely ineffective, since they do not have the power nor the strong, rigid teeth required for this operation. An ordinary lawnmower is also ineffective, since the thatch, particularly after it is dead and dried, lies too close to the ground surface to be reached by the lawnmower blades.

Accordingly, the principal object of the present invention is the provision of a device adapted to accomplish the removal of grass thatch as described above in a rapid, easy and convenient manner.

Another object is the provision of a grass thatch remover of the character described which is adapted to be furnished and used as a simple, inexpensive attachment for an ordinary rotary lawnmower.

Other objects are extreme simplicity and economy of construction, efficiency and dependability of operation, and adjustability to compensate for widely varying operating conditions and circumstances.

Figure 1:
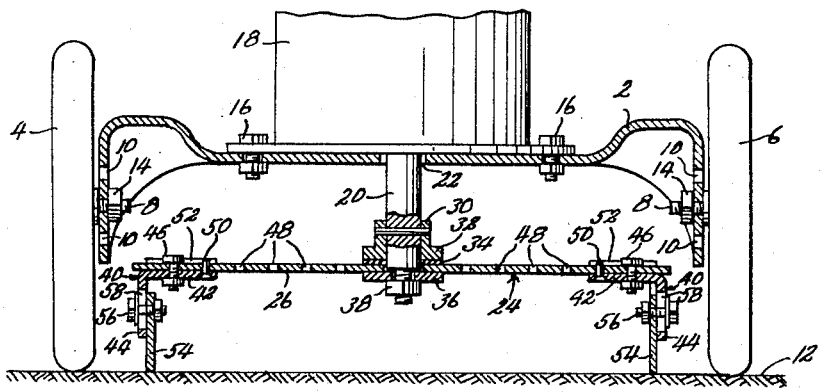
Figure 2:
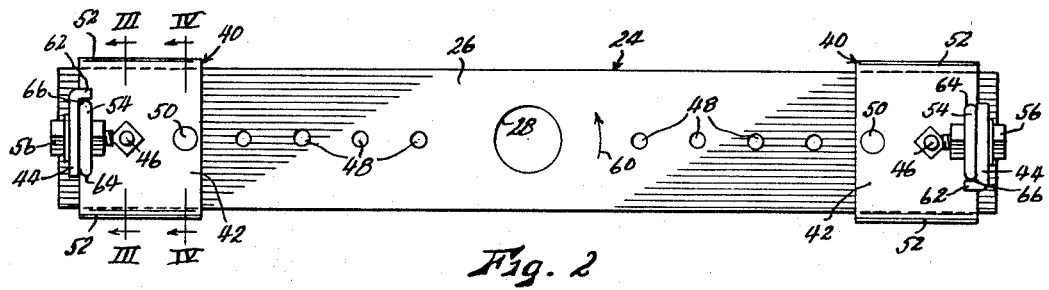
Figure 3:
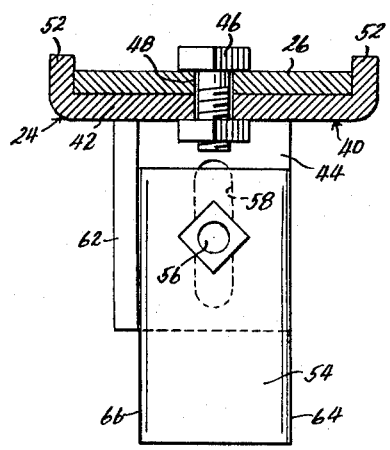
Figure 4:
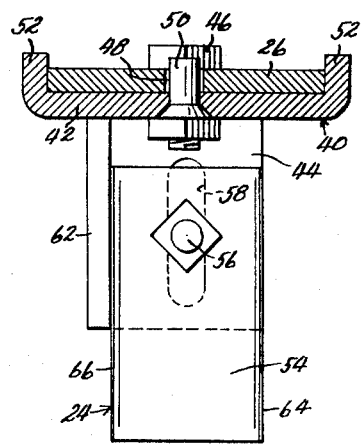

With these objects in view, as well as other objects which will appear in the course of the specification, reference will be had to the accompanying drawing, wherein:

FIG. 1 is a transverse vertical sectional view through a rotary lawnmower having a thatch remover attachment embodying the present invention mounted operatively thereon, FIG. 2 is an enlarged, inverted plan view of the thatch remover attachment only, shown detached from the lawnmower, FIG. 3 is an enlarged sectional view taken on line III—III of FIG. 2, and FIG. 4 is an enlarged sectional view taken on line IV—IV of FIG. 2.

Like reference numerals apply to similar parts throughout the several views, and the numeral 2 applies to the frame of an ordinary rotary lawnmower. Said frame is usually formed of cast metal, and is of inverted bowl shape, being supported above the ground by a plurality of ground-engaging wheels characterized by those indicated at 4 and 6. As shown, the axle 8 on which each of the wheels is rotatably mounted is inserted selectively in any one of a series of vertically spaced apart holes 10 provided therefore in frame 2, whereby to adjust the elevation of said frame above the ground line 12, and secured by a lock nut 14 threaded thereon. Mounted rigidly on the top surface of frame 2, as by bolts 16, is a power unit 18 such as an electric motor or gasoline engine. The power output shaft 20 of said power unit extends vertically downwardly through a hole 22 of said frame, and normally has the blade bar of the lawnmower affixed to the lower end thereof. Though not shown, said blade bar of course usually comprises an elongated horizontal bar fixed at its midpoint to drive shaft 20 and having laterally operative cutting edges at or adjacent its respective ends.

The thatch remover attachment forming the subject matter of the present invention is indicated generally by the numeral 24, and is adapted to be mounted on drive shaft 20 in place of the usual blade bar. Said attachment includes a planar, elongated carrier bar 26 having a circular hole 28 formed centrally therethrough. Drive shaft 20 has a sleeve 30 affixed thereto adjacent its lower end, said sleeve having a peripheral flange 32 at its lower end, said drive shaft extending below said flange. Below said flange, shaft 20 extends successively through a compressible friction washer 34, through hole 28 of carrier bar 26, through a heavy metal washer 36, and has a nut 38 threaded on the reduced lower end thereof. As nut 38 is tightened, friction washer 34 is compressed to resist frictionally but yieldably any rotation of bar 26 relative to the shaft, for a purpose which will presently appear. This mounting of carrier bar 26 is the same as the blade mountings of many lawnmowers, and the standard blade mounting of the lawnmower may therefore be used with the present thatch remover. Also, carrier bar 26 could be formed to be engaged by the blade mounting members of various other types of lawnmowers.

Attached to each end of the carrier bar 28 is an L-shaped clip designated generally by the numeral 40, said clip being formed of sheet metal and having a horizontal leg 42 lying flat against the lower surface of bar 26 and a vertical leg 44 depending from said bar. Horizontal leg 42 is secured to bar 26 by a bolt 46 which extends therethrough selectively through any one of a series of holes 48 formed in bar 26 in longitudinally spaced apart relation therein. By inserting bolts 46 in various corresponding sets of holes 48, clips 40 may be disposed at different distances from the axis of rotation of shaft 20. Legs 42 of each clip 40 also has a stud 50 riveted therein and extending upwardly therefrom parallel to bolt 46, said stud engaging slidably in the hole 48 of carrier bar 26 next adjacent the hole engaged by bolt 46. Stud 50 serves to relieve the considerable shearing stress to which bolt 46 would otherwise be subjected whenever shaft 20 is rotated at high speed. The opposite longitudinal edges of legs 42 are bent upwardly to form flanges 52 which slidably engage the longitudinal edges of carrier bar 26, as best shown in FIGS. 3 and 4, whereby further to stabilize the clips on the carrier bar.

The vertical leg 44 of each clip 40 has attached thereto a thatch removing finger 54 constituting a flat, vertically elongated bar of steel or the like with the plane thereof disposed tangentially to its orbit of rotation. Said finger is secured fixedly to clip leg 44 by a bolt 56 extending therethrough and through a vertically elongated slot 58 formed in leg 44 whereby the finger may be adjusted vertically with respect to the clip. Finger 54 extends below clip 40 substantially to the ground level as shown. Finger 54 is preferably disposed against the inner surface of clip leg 44 so as to be urged outwardly against said leg by centrifugal force, thereby relieving bolt 56 of the substantial tensile stress to which it would be subjected if the finger were disposed at the outer side of the leg. The vertical edge portion of clip leg 44 at the trailing edge of finger 54, considering that carrier bar 26 rotates in the direction of arrow 60 in FIG. 2, is bent inwardly to form a flange 62 which abuts the trailing edge of the finger. This flange stabilizes the finger against rotation on bolt 56, and also absorbs much of the force exerted against the finger by the grass thatch. It should be noted that fingers 54 will better serve their intended function of thatch removal if they rip and tear at the thatch rather than cutting or slicing it cleanly. Therefore the vertical edges 64 and 66 of each finger are not sharpened to form cutting edges, but are bluntly rounded as shown in FIG. 2. Of course, only one edge (edge 64 as shown) of each finger is operative at any one time, but if this edge becomes worn away by the abrasive action of the grass thereagainst, then bolts 56 may be removed and the fingers reversed to bring edges 66 into play, and the useful life of the fingers is thus doubled.

In use, the usual blade bar assembly of the lawnmower is removed from drive shaft 20 and carrier bar 26 attached in place thereof as previously described. The purpose of having the carrier bar rotatable on shaft 20, with rotation yieldably resisted by friction washer 34, is that if either of fingers 54 should strike a rock, sidewalk edge or other obstruction and its motion thereby halted or sharply reduced, shaft 20 may continue to turn. This greatly reduces any danger that the drive shaft may be bent by the shock thereby imposed thereon, which would require major repairs. The parts are then adjusted so that the lower ends of fingers 54 are substantially at the ground level 12. Very effective operation has been found to be provided if fingers 54 are adjusted so that when lawnmower wheels 4 and 6 are rolled along a hard, flat surface such as concrete, the lower ends of fingers 54 just scrape said surface. This adjustment may be provided in virtually any lawnmower either by inserting wheel axles 8 in various of holes 10 of the mower frame, or by loosening bolts 56 and adjusting fingers 54 vertically on clip legs 44, or both. If the lawnmower does not have vertically adjustable wheels, then only the adjustment provided by bolts 56 can be used. If the lawnmower does have vertically adjustable wheels, coarse adjustments can be made in this manner, while bolts 56 can be loosened to make the final fine adjustments. The device is then moved over the lawn in the manner of an ordinary lawnmower, with power unit 18 in operation, whereupon the fingers 54 will rip and tear the thatch of grass down to the actual ground level, thoroughly loosening it and separating it from the ground. If so desired and so set, the fingers will actually "shave" the ground completely free of all vegetation, but without disturbing the roots, and this is generally the desired result in the thatch removing operation. If the lawnmower is equipped with a grass catcher, much of the removed thatch will be caught and removed thereby. If not, the removed thatch may be raked or swept up in a separate operation.

Ordinarily, the fingers 54 are preferably disposed at the extreme outer ends of carrier bar 26, in order that as wide a swath of thatch as possible will be removed for each pass of the device over a lawn. However, in some cases the thatch of a lawn may be so thick, tough and closely woven that the power unit of the usual lawnmower is completely inadequate to drive the fingers through said thatch at the requisite speed, or even at all, with the fingers so widely spaced apart. In such instances, bolts 46 may be removed and clips 40 moved inwardly toward the center of carrier bar 26, bolts 46 then being re-inserted in another corresponding set of holes 48. This of course reduces the width of the swath of grass thatch removed for each pass of the device over a lawn, but also reduces the torque required to drive the carrier bar, so that the device may be operated within the power limitations of motor or engine 18. The vertical adjustability of fingers 54 on clip legs 44 permits them to be moved downwardly to compensate for wear as the lower ends thereof are abraded by contact with the thatch and with the ground. When the fingers become so worn as to be unusable, they may be easily and inexpensively replaced.

While we have shown and described a specific embodiment of our invention, it will be readily apparent that many minor changes of structure and operation could be made without departing from the spirit of the invention as defined by the scope of the appended claims.

What we claim as new and desire to protect by Letters Patent is:

1. For use in combination with a rotary lawnmower including a wheeled frame carrying a power unit having a vertically downwardly extending power output shaft, a grass thatch remover attachment comprising:
    (a) a horizontal carrier bar,
    (b) means for attaching the midpoint of said carrier bar to the lower end of said power shaft for rotation therewith, whereby said carrier bar is supported in spaced apart relation above the ground level, and
    (c) means affixing each of said fingers to said carrier bar respectively at opposite sides of the axis of rotation of the latter and in spaced apart relation thereto, whereby said fingers depend from said carrier bar with their lower ends closely adjacent the ground level, said affixing means comprising:
        (1) a clip,
        (2) means affixing said clip to said carrier bar whereby said clip may be moved adjustably longitudinally along said carrier bar, and
        (3) means affixing said finger to said clip, whereby said finger may be adjusted vertically with respect to said clip.

2. The structure as recited in claim 1 wherein said clip includes a leg depending from said carrier bar and wherein the associated finger is secured against the face of said leg nearest the axis of rotation of said carrier bar, whereby said leg supports the centrifugal force exerted by said finger during rotation of said carrier bar.

3. For use in combination with a rotary lawnmower including a wheeled frame carrying a power unit having a vertically downwardly extending power output shaft, a grass thatch remover attachment comprising:
    (a) a horizontal carrier bar,
    (b) means for attaching the midpoint of said carrier bar to the lower end of said power shaft for rotation therewith, whereby said carrier bar is supported in spaced apart relation above the ground level, and
    (c) means affixing each of said fingers to said carrier bar respectively at opposite sides of the axis of rotation of the latter and in spaced apart relation thereto, whereby said fingers depend from said carrier bar with their lower ends closely adjacent the ground level each of said fingers constituting a vertically elongated planar bar the plane of which is disposed tangentially to its orbit of rotation and the vertical edges of which are bluntly rounded, and wherein said means fixing said finger to said carrier bar is operable to permit reversal of said finger whereby either vertical edge thereof may be the leading edge with respect to its direction of rotation.

References Cited
UNITED STATES PATENTS

| | | | |
|---|---|---|---|
| 2,721,438 | 10/1955 | O'Maley | 56—295 |
| 2,822,657 | 2/1958 | Chaffee | 56—295 |
| 3,117,633 | 1/1964 | Hosek | 56—295 X |
| 3,167,899 | 2/1965 | Best | 56—295 X |
| 3,184,903 | 5/1965 | Fjelstad | 56—295 X |

RUSSELL R. KINSEY, *Primary Examiner.*